United States Patent
Struye et al.

(12) 
(10) Patent No.: US 6,476,406 B1
(45) Date of Patent: Nov. 5, 2002

(54) DEVICES EQUIPPED WITH TRIBOSTIMULABLE STORAGE PHOSPHORS

(75) Inventors: Luc Struye, Mortsel (BE); Peter Willems, Stekene (BE); Paul Leblans, Kontich (BE); Jean-François Gervais, Mérignac (FR)

(73) Assignee: Agfa-Gevaert, Mortsel (BE)

( * ) Notice: Subject to any disclaimer, the term of this patent is extended or adjusted under 35 U.S.C. 154(b) by 197 days.

(21) Appl. No.: 09/598,500

(22) Filed: Jun. 22, 2000

Related U.S. Application Data
(60) Provisional application No. 60/140,983, filed on Jun. 29, 1999.

(30) Foreign Application Priority Data

Jun. 22, 1999 (EP) ............................................. 99201989

(51) Int. Cl.⁷ ............................. G01L 1/22; G03B 42/02
(52) U.S. Cl. ......................... 250/585; 250/583; 73/762
(58) Field of Search ................................ 250/585, 581, 250/582, 588, 580, 583; 73/762, 763

(56) References Cited

U.S. PATENT DOCUMENTS

| | | |
|---|---|---|
| 3,859,527 A | 1/1975 | Luckey |
| 4,806,757 A | 2/1989 | Kano et al. |
| 5,028,509 A | 7/1991 | Shimada et al. |
| 5,055,681 A | 10/1991 | Tsuchino et al. |
| 5,446,334 A * | 8/1995 | Gaffney .................... 250/338.3 |
| 5,817,945 A | 10/1998 | Morris et al. |
| 5,905,260 A | 5/1999 | Sage et al. |
| 6,281,617 B1 * | 8/2001 | Qiu et al. .................... 310/311 |

FOREIGN PATENT DOCUMENTS

| | | |
|---|---|---|
| EP | 0 558 771 A1 | 9/1993 |
| EP | 0 751 200 A1 | 1/1997 |
| GB | 2 232 119 A | 12/1990 |
| WO | WO 97/16834 * | 5/1997 ........... H01C/10/10 |

OTHER PUBLICATIONS

Oliver Graydon: "Composites Glow Where They Crack", OPTO & Laser Europe, vol. 61, Apr. 1999, pp. 26–27, XP002122082.

* cited by examiner

*Primary Examiner*—Constantine Hannaher
*Assistant Examiner*—Albert Gagliardi
(74) *Attorney, Agent, or Firm*—Breiner & Breiner, L.L.C.

(57) ABSTRACT

A device built-in in a housing and capable to determine a pressure force in a quantitative way has been provided, the device including a storage phosphor panel or plate having storage phosphors essentially having tribostimulable properties, thereby providing energy conversion of the phosphors by means of pressure force or pressure energy to be determined. The method of measuring the pressure energy has also been described.

17 Claims, 2 Drawing Sheets

DEVICES EQUIPPED WITH TRIBOSTIMULABLE STORAGE PHOSPHORS

RELATED PATENT APPLICATION

This patent application claims benefit of U.S. Provisional Application Serial No. 60/140,983 filed Jun. 29, 1999.

FIELD OF THE INVENTION

The present invention is related with an application of a novel method available to release energy stored in stimulable phosphors, coated in storage phosphor panels. So the present invention relates to a device essentially providing particular storage phosphors as composite compounds having the ability to absorb and to store part of absorbed X-ray and/or UV-ray energy and to emit part of it again under stimulating forces in form of (visible) detectable light energy. This invention also relates to a method of recording and reproducing said energy, pattern-wise where desired, by means of a screen or panel containing such phosphors and built in in the said device.

BACKGROUND OF THE INVENTION

Well-known in diagnostic imaging is the use of phosphors in the production of X-ray images. In a conventional radiographic system an X-ray radiographic image is obtained by X-rays transmitted imagewise through an object and converted into light of corresponding intensity in a so-called intensifying screen (X-ray conversion screen) wherein phosphor particles absorb transmitted X-rays and convert them into visible light and/or ultraviolet radiation. As silver halide grains or crystals, present in emulsions coated in layers of a silver halide photographic film material are more sensitive to the thus converted X-ray energy than to direct impact of X-rays (due to a less effective absorption of those energetic X-rays) the said conversion is in favour of image formation on the film material.

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores energy contained in the X-ray radiation pattern. At some interval after the exposure, a beam of visible or infra-red light scans the panel in order to stimulate the release of stored energy as light that is detected and converted to sequential electrical signals which can be processed in order to produce a visible image. For this purpose, the phosphor should store or accumulate as much as possible of the incident X-ray energy and emit an amount of the stored energy as low as possible before stimulation by the scanning beam. This form of radiography, wherein use is made of storage phosphor screens or panels, also called stimulable phosphor panels or accumulation phosphor panels is called "digital radiography" or "computed radiography".

Use of alkali metal halide phosphors in storage screens or panels is well known in the art of storage phosphor radiology, wherein at least part of the energy contained in an X-ray pattern is temporarily stored. The high crystal symmetry of these phosphors makes it possible to provide structured screens and binderless screens, in favour of image quality. Examples of such alkali metal phosphor can be found in several documents. In e.g. U.S. Pat. No. 5,028,509 a phosphor corresponding to general formula $(M_{1-x}. M^1{}_x)X.aM^{2+}X_{-2}. bM^{3+}X_{-3}:dB,$ wherein M is Cs or Rb, M' is at least one metal selected from the group consisting of Li, Na, K, Rb, and Cs, $M^{2+}$ is at least one metal selected from the group consisting of Be, Mg, Ca, Sr, Ba, Zn, Cd, Cu and Ni, $M^{3+}$ is at least one metal selected from the group Sc, Y, La, Ce, Pr, Nd, Pm, Sm, Eu, Gd, Tb, Dy, Ho, Er, Tm, Yb, Lu, Al, Ga and In; X, X' and X" may be the same or different and each of them represents a halogen atom selected from the group consisting of F, Br, Cl, I provided that all X' atoms are the same, B is an element selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In. $0<x<1$ en $0<a<1$ en $0<b<0.5$ en $0<d<0.2$ In U.S. Pat. No. 5,055,681 a binderless screen comprising the phosphor as disclosed in U.S. Pat. No. 5,028,509 has been disclosed. In U.S. Pat. No. 4,806,757 a CsI phosphor has been disclosed, comprising between 0.0001 to 1 mole % of at least one element selected from the group consisting of Li, K, Rb, Cu, Au, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb and Bi.

Alkali metal halide phosphors performing as desired qualities absorption characteristics, speed, storage capabilities etc. have been disclosed in EP-A 0 751 200, wherein besides high speed also high chemical stability and low sensitivity to humidity have been appreciated as well as ability to produce screens comprising vapour deposited phosphor layers providing high image definition.

The radiation image storage phosphor screen according to that invention comprises an alkali metal halide phosphor characterized in that said phosphor contains a dopant selected from the group consisting of $Ga^{1+}$, $Ge^{2+}$, $Sn^{2+}$, $Sb^{3+}$ and $As^{3+}$. In a preferred embodiment thereof the alkali metal is Cs and/or Rb.

In order to provide a method for recording X-rays following steps were recommended:

(i) exposing the photostimulable storage phosphor screen, comprising novel alkali metal halide phosphors, (ii) stimulating said photostimulable screen in order to release the stored X-ray energy as stimulated light and (iii) collecting said stimulated light.

In order to release energy stored by a stimulable phosphor use has hitherto often been made of optical light sources as mentioned hereinbefore. As a consequence thereof optical filters are required in order to separate light emitted by the storage phosphors after stimulation and light originating from the stimulation source. In order to develop a scan-head in order to scan a plate or panel built-up with stimulable phosphors in order to release said stored energy, it is recommended to reduce the volume of such a scan-head to a minimum. Especially when the detector, collecting said stimulated light is a CCD with Fiber Optic Plate (FOP), the image plate should be placed in direct contact with this fiber optic plate in order to obtain a sufficiently good resolution. Presence of any additional intermediate layer, as e.g. a filter layer, may lay burden thereupon and any measure in order to simplify the process of reading out a storage phosphor is welcome as well as any development in form of a practically useful device as a spin-off therefrom.

OBJECTS OF THE INVENTION

Therefore it is an object of the present invention to provide one or more device(s) offering an easy method in order to stimulate storage phosphors, wherein said device is essentially provided with panels built up with such storage phosphors.

It is a further object of the present invention to extrapolate said method in order to provide practically useful devices as a spin-off thereof.

Any other object will become apparent from the description hereinafter.

SUMMARY OF THE INVENTION

A device for measuring a pressure force or changes thereof (directly or indirectly) applied by a pressure source differing from a direct air pressure energy source and for reading out said pressure force, has been provided as a spin-off from the property of "tribostimulability" of storage phosphors, wherein said device essentially comprises a (tribo)stimulable storage phosphor sheet or panel and means in order to apply said pressure force onto said stimulable storage phosphor sheet or panel and wherein said pressure source and said storage phosphor panel are positioned relative to each other (with or without intermediate means) so that pressure or variations thereof caused or generated (directly or indirectly) by said pressure source reach said stimulable phosphor, also called tribostimulable phosphor, thereby stimulating said phosphor by pressure in order to release tribostimulated light, said device further having capturing means to capture said tribostimulated light and detecting means to detect it (and to measure it after detection as a measurable signal).

Because of the proportionality of the emitted light energy with the applied pressure, the technique is suitable for measuring pressure forces and provides methods to do so.

Specific features with respect to preferred embodiments of the invention are disclosed in the dependent claims and further advantages and embodiments of the present invention will become apparent from the following description and drawings.

DETAILED DESCRIPTION OF THE INVENTION

Figure 1:
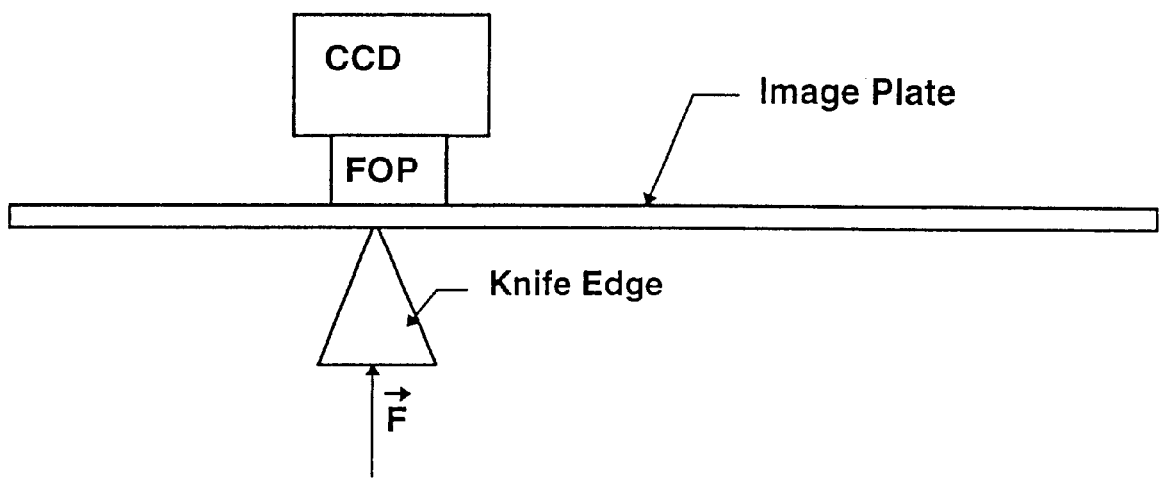
FIG. 1 shows an Image Plate essentially consisting of a storage phosphor plate wherein an "X-ray" image has been stored. By means of a Knife Edge a pressure force F is performed linewise on the Image Plate, whereby the stored energy is released and becomes read-out by a CCD via a Fibre Optic Plate (FOP).
Figure 2:
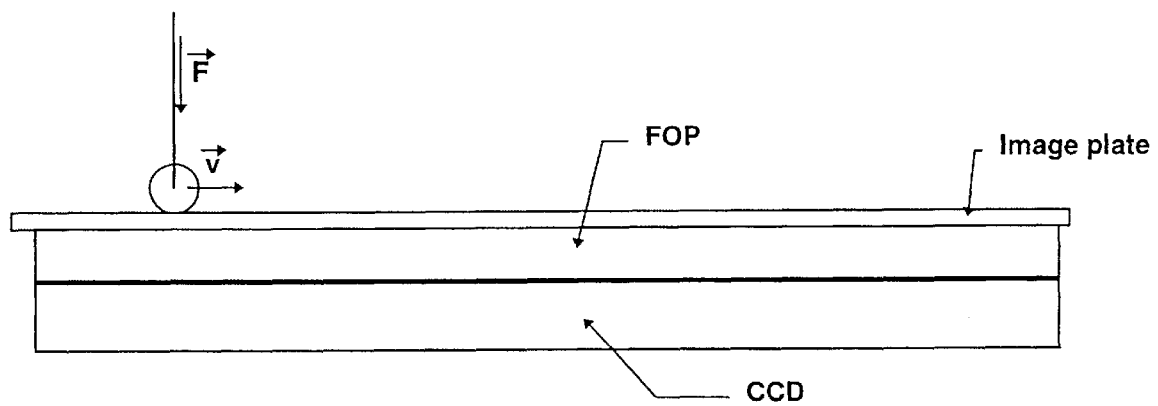
FIG. 2 shows an Image Plate essentially consisting of a storage phosphor plate, just as in FIG. 1, wherein an "X-ray" image has been stored. By means of a continuously rolling roller (opposite to the discontinuous linewise registration by the Knife Edge as in FIG. 1), wherein the said roller linewise performs a pressure force F on the Image Plate, the stored energy is released and becomes read-out by a CCD via a Fibre Optic Plate (FOP).
Figure 3:
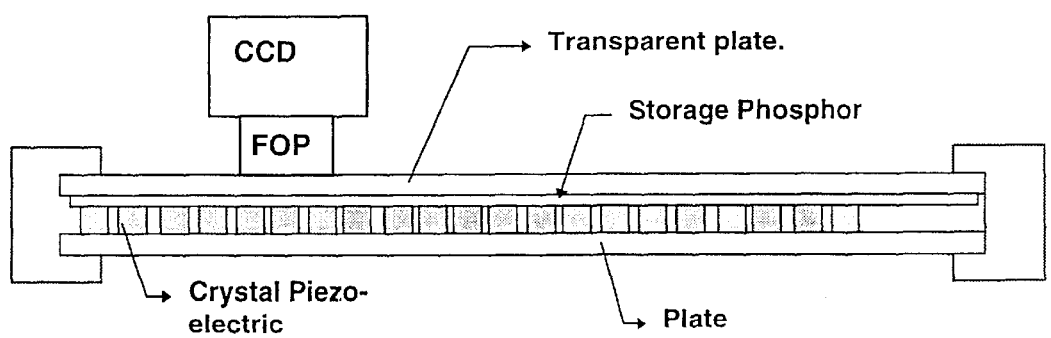
FIG. 3 shows a Plate carrying a layer having Piezo-electric Crystals, whereupon and in direct contact with it, the Storage Phosphor layer is present, said Storage Phosphor layer being covered with a Transparent plate. The "X-ray" image stored in the Storage Phosphor layer is read-out after release of stored energy by a pressure force generated pixelwise by the said Piezo-electric Crystals. As a detector, just as in FIG. 1 use is made of a CCD, capturing the pressure converted and released energy via a Fibre Optic Plate (FOP).

In this document the term "X-ray" should be understood as "any penetrating radiation" and includes i.a. radiation originating from a radioisotope (e.g. a $Co^{60}$ source), radiation created by an X-ray generator of any type, radiation and high energy particles created by a high energy radiation generator (e.g. Betatron), radiation from a sample labelled with a radioisotope as is the case in e.g. autoradiography.

Although composites showing "triboluminescence" are known in literature as e.g. described in Opto & Laser Europe, issue 61, published April 1999, wherein it has been established that "composites glow where they crack" and that "Reinforced polymers that emit red, green or blue light where they fracture could give aircraft a "skin" that senses damage" as described in a report on the performance of resins containing light-emitting crystals, nothing has been suggested nor disclosed about "tribostimulability" of storage phosphors or stimulable phosphors. It has thus unexpectedly been found that conversion of energy stored in phosphor composites having energy storage properties, like the storage phosphors, well-known in image storage phosphor plates or panels used in diagnostic imaging by X-rays, converting is, besides the well-known stimulability by lasers, performed by means of a source of pressure energy. This pressure energy is differing from pressure energy directly generated from an air pressure source, the determination of which has been described in EP-A 0 558 771, wherein use is made from luminescent oxygen sensitive pressure sensitive compositions, having no specific storage properties.

Storage phosphors suitable for releasing stored energy by means of pressure are called "tribostimulable phosphors" in the present invention. Said tribostimulable phosphors in most general form are alkali metal-halide phosphors and, more preferably are alkali metal halide phosphors have a composition based on CsBr, Cs Cl, KCl and KBr. A more preferred suitable "tribostimulable" phosphor providing release of stored energy to be read-out under the influence of pressure energy is CsBr:Eu. The mechanism has also been found to apply to other phosphor compositions as there are CsBr and Cs Cl (without further dopant); CsBr:Eu,Gd; CsBr:Ga; CsBr:Ca; CsBr:Sr; CsBr:Gd; CsBr:CsF; CsBr:CsOH; $CsBr:Cs_2CO_3$; $CsBr:Cs_2SO_4$; CsBr:Ge CsBr:Sn; CsBr:Au; Cs Cl:Eu; Cs $Cl_{0.5}Br_{0.5}$:Eu; CsBr:In; CsBr:Ce; CsBr:In,Ce; CsBr:Tb RbBr:Ga; RbBr:Ga,Li and more in general terms to all phosphors mentioned in U.S. Pat. No. 5,028,509 and in EP-A 0 751 200. Further interesting storage phosphors are KBr:Cu; KCl:Cu; KCl(1–x) Br(x):Eu, wherein 0<x<1 and KCl(1–x)Br(x):Cu, wherein 0<x<1. KBr:Eu is a particularly preferred pressure stimulable storage phosphor giving rise to the emission of blue light after having been pressure stimulated. As a further advantage e.g. versus CsBr:Eu it is much less moisture sensitive. Moreover from the point of view of dark discharge it is a very interesting and suitable pressure stimulable phosphor. Methods suitable for the determination of "tribostimulability" of storage phosphors have been described in the Examples hereinafter. Phosphors present in samples (normally provided in supported coated screens or panels, but also in self-supporting panels) suitable for use in most general form as an essential part of devices according to the present invention, and pressure meters in particular, clearly show emission of visible light from the moment that the pressure force applied thereon by a pressure source is varying the said originally applied pressure force. Variations in pressure force are thus immediately detected. In a dark room the light emitted from the sample or screen coated with such a storage phosphor or stimulable phosphor, also called "tribostimulable" phosphor, by performing a pressure force variation is clearly observed through an optical filter at the moment that said force variation is applied. The intensity of the emitted light caused by the pressure force variations is very much higher than emitted light caused by afterglow. It has e.g. been found also that the "tribostimulable" crystals are emitting light energy very strongly (with a high light intensity) when the surface of the crystal has been damaged with a knife or even with a finger nail. So when the tribostimulable crystal is "cracked" an intense light pulse is detected. When the tribostimulable storage phosphor crystal, thus showing "tribostimulability", is not exposed to X-rays or is completely erased with a light source after stimulation it has clearly been established that no emitted light is leaving the crystal after application of a pressure force (variation), wherein the crystal has been damaged or cracked.

It is thus clear that only stored energy, captured after a previous exposure with ionization radiation (as e.g. X-rays) of a composite storage phosphor crystal having tribostimulable properties as the crystals presented hereinbefore is released by pressing, damaging or cracking the said crystal and that the said released energy is proportional with the applied pressure or pressure variations.

In order to produce a pressure meter the crystal(s) can be placed permanently on the place where the pressure should be measured. The crystal(s) should be irradiated before with incident radiation energy having a wavelength of 350 nm or less; more preferably with UV-rays and/or X-rays in order to provide an amount of stored energy. The device according to the present invention thus has a tribostimulable storage phosphor panel which absorbs calibrated amounts of energy, generated by incident radiation (X-ray and/or UV-radiation) having a wavelength of 350 nm or less (in order to permit release of (tribo)stimulated light energy in an amount proportional with the said pressure force and in order to determine said pressure force in a quantitative way).

This source of energy should preferably be built in the device according to the present invention in favour of ease to handle, although, for more industrial applications, depending on the scale whereupon the device should be used, an external irradiation is more preferred. Especially when X-rays are a more preferred source of irradiation security measures are required: a device having a chamber, the walls of which have been covered with lead foils and wherein an X-ray source is present in order to irradiate a storage phosphor panel should then be constructed. It is clear that also irradiation with an UV-source requires security measures, e.g. in form of suitable UV-filters, in order to protect the user and, in particular, the user's eyes and skin.

As it is easy to measure said amount of irradiation energy it is easy to calibrate the amount of stored energy in a quantitative way. Once the tribostimulable storage phosphor is loaded with an amount of stored energy, the energy or radiation in form of light emitted after stimulation of the said tribostimulable storage phosphor (present as a single crystal or as crystals coated as self-supporting screen or panel or coated onto a support) by a pressure source, causing pressure force variations, is detected with a detector, e.g. a photomultiplier, at the time and during the time the said pressure force variations are caused by said pressure source or sources causing said pressure variations. Because the phosphor and the detector are reacting quickly, short and rapid pressure force variations are detected in this way. In dedicated applications it is useful to plot the said pressure force variations as a function of time. As the reaction time of the system is less than 1 $\mu$s such a quick detection is superior with respect to detection speed in order to determine changes in pressure forces.

This technique or method is thus suitable for use in those applications where a pressure force differing from pressure by air directly in contact with the panel is present during a very short time, or where quick variations of pressure forces should be detected. Devices according to the present invention are thus suitable for use in a lot of applications. Examples thereof are given hereinafter, without however being exhaustive.

Pressure sources causing variable pressures which are perfectly detectable by devices according to the present invention thus applying the method of the present invention are e.g. pressure force variations caused by crashes of cars in accidents, or even more generally in crashes in traffic (trains, aeroplanes, etc.). During the crash a short but high force is generated. Measuring this force as a function of time provides helpful tools in order to develop e.g. safer cars in favour of security of the driver and of the passengers. Detection as a function of the sites on the vehicle where crashes appear gives engineers an opportunity to work out safer constructions for the future in the motor-car industry.

Another example wherein variable pressure sources should be detected is the pressure force of a bullet when hitting an obstacle or pressure forces caused by objects flying around after having been thrown away or catapulted into the environment by an explosion. For the bullets and for the explosives an optimization of the accuracy of fire can thus be provided, e.g. as a function of distance, etc. Otherwise an optimization of hit materials in order to provide protection against bullets from fire-arms or against splinters from explosions as, e.g. by safety glass (also useful for cars), is another valuable application. Testing of the ability of materials to withstand pressures and pressure variations in general is a very useful application for the device according to the present invention. So materials hit by acoustic waves, measurable as pressure waves, e.g. in-noise control etc. are perfectly tested and warning signals can be provided when an undesired or even dangerous level is exceeded.

A further useful example is the detection of the force and variations thereof as a function of a load transported by a truck or trailer. When one or more detectors are put on the load, and more preferably, at one or more edges thereof, the trucker can be warned by signals sent by the detector(s) to the cabin, e.g. on a display giving an optical signal or, more preferably by an acoustic signal in order to warn the driver when the load is moving during transport before hitting the wall of the truck or trailer or before causing desequilibrium of the load and danger to be canted or tilted.

So quite a lot of other applications where pressure variations can be detected are available, as e.g. when providing security systems to houses against break-in, any changement from a system in equilibrium or balanced system to undesired unbalanced situations. Still another example, without being exhaustive, is the force created by the vibrations of earth-shivering, e.g. as a warning signal for future earthquakes, vulcan eruptions and the like, thus providing warning signals for geographic and geological scientists. Analysis of vibration patterns (shock waves, acoustic waves,etc. causing detectable pressure variations) would provide those scientists with useful data in order to predict the time, site and intensity of threatening disasters caused by such natural phenomena and would give the authorities time to organize evacuations if required. Because of the short reaction times of this technique, as already mentioned herinbefore, vibrations having high frequencies are detectable and frequency spectra of pressure variations analyzed. Otherwise making use of such a technique provides detectability of noises caused e.g. vibrations in production processes which are very sensitive thereto, as e.g. in coating processes, wherever required as in production of coatings, in the photographic industry, in chips production as e.g. in microelectronic applications, in astronomy where high stability of e.g. telescopes is required, thus requiring high stability from the buildings wherein such apparatus are mounted, and in all machines and devices requiring high quality equilibrium situations, as in cybernetics, measuring fault techniques, fault-find apparatus, in scientific apparature in laboratories, in barometers as a special application of pressure meter expressing changes in atmospheric air pressure, wherein said changes are not the result of direct interaction of air with the phosphor plate or panel having trimostimulable storage phosphors but where the said air pressure differences have already been converted into fluctuating mechanical forces, etc.

The pressure meter device described hereinbefore comprising a "tribostimulable" phosphor crystal, present in a coated (self-supporting or supported) layer of a panel, screen or plate as an essential element which has been described hereinbefore, according to the present invention comprises, as part of a housing wherein said device is built-in, in order, a tribostimulable storage phosphor panel as a storage medium for absorbing energy, and more preferably calibrated amounts of energy, generated by incident radiation energy having a wavelength of 350 nm or less, and more preferably having an X-ray and/or UV-radiation source, and, adjacent thereto, transmission means permitting to apply a pressure force and variations thereof onto said tribostimulable storage phosphor panel by means of said pressure source, thereby stimulating said tribostimulable storage phosphor panel in order to release stimulated light energy, preferably in an amount proportional with the said pressure force.

Whereas the device according to the present invention, in one embodiment, permits pressure force or pressure force variations to be performed directly onto said tribostimulable storage phosphor panel, in another embodiment a pressure force or variations thereof are indirectly performed by means of transporting or transmission means, thereby stimulating said tribostimulable storage phosphor panel in order to release tribostimulated light energy.

According to the present invention the device comprising capturing means captures energy released from the tribostimulated phosphor sheet or panel in an amount proportional with the said pressure force.

According to the present invention the device wherein said panel, said capturing and said detecting means are built-in in a housing is thus available as a pressure meter device.

In the device according to the present invention preferred transmission means (of the pressure forces and variations thereof) are provided by a mechanical, an electrical, an electronical, a hydraulic or a pneumatic system wherein differences in air pressure energy have already been converted into mechanical pressure energy, thus differing from direct pressure energy on the panel by air or gas molecules in more general terms, without however being limited thereto.

In the embodiment wherein the mechanical system is used a crystal is pressed between two plates. One of those plates is connected with a stick (preferably a metal stick or a stick made of composite materials) with the pressure source. When using a hydraulic system, a liquid is preferably pressing a plate to the crystal instead of being in direct contact therewith. When the tribostimulable phosphor is hygroscopic, like most of those phosphors are, except from those mentioned hereinbefore wherefore direct contact is principally possible, the said phosphor is not placed into the liquid. Using a pneumatic system, a gas is pressing a plate to the crystal, but positioning the tribostimulable phosphor directly into the gas is not excluded. When doing so the pressure of the gas is detected through a transparent area of the tube.

In one embodiment said means providing transport or transmission of the pressure forces and variations thereof is an electrical or an electronic system wherein a piezo-electric crystal is converting an electrical signal into pressure energy. In another embodiment said device according to the present invention wherein said means providing transport or transmission of the pressure forces and variations thereof is an electrical system, said transmission means permits pixelwise detection of variations in electrical signals performed by means of at least one layer of piezo-electrical crystals as a source of pressure energy.

When said piezo-electrical crystal is in contact with a stimulable phosphor crystal the thus generated pressure force or pressure force variation is detected in form of light energy emitted from the phosphor crystal by pressure stimulation. Arranging the piezo-electrical crystals in one row or array provides measuring pressure and pressure variations in one dimension, i.a. linewise. Providing more arrays of piezo-electrical crystals as a source of pressure energy makes available detection of pressure energies and variations thereof in two dimensions and, in accordance with the present invention, the device provides an image. In this application however it is not the purpose to provide a radiological image, although this is principally possible (e.g. by "activation" of the pixel-wise arranged piezo-electrical crystals by pixel-wise generating electrical pulses from digitally stored information (e.g. captured from X-ray images obtained by CT-techniques, echography, CRT's, laser sources, acoustic signals etc.). The stability of any light source or any acoustic energy source (required e.g. when accurate and well-known amounts of energy should be added as in medical therapies or in micro-electronics and/or measured as in digitizing techniques, speech technology, etc.) can thus be analyzed very quickly with a high accuracy and even in quantitative way after calibration of the measuring device.

In a particular embodiment the device according to the present invention, more particularly the device having a layer of piezo-electrical crystals pixelwise performing pressure on the said storage phosphor panel in order to read-out said tribostimulable storage phosphor panel imagewise by direct contact between said piezo-electrical crystals and said storage phosphor panel is provided with means in order to apply an electrical field on said piezo-electrical crystals by row and column electrodes, provided at both sides of said layer and mounted perpendicularly to each other, coupled to a voltage source adapted for applying an electrical potential to each of said electrodes separately.

Otherwise the device according to the present invention provides, in a particularly preferred embodiment, an imagewise pattern corresponding with e.g. a stiffness pattern or a relief pattern of a test material: sites where less stiffness is measured give rise to less deformation of the piezo electrical crystal, thus without creating a high pressure, opposite to sites showing a higher degree of stiffness. In praxis in this application the tribostimulable storage phosphor plate or panel is uniformly exposed with X-ray or UV-light in order to get accumulation of equal amounts of stored energy over the whole panel.

So the device according to the present invention thus provides, in a particularly preferred embodiment, an imagewise pattern corresponding with a stiffness or a relief pattern of a test material.

As in the case of pixel-wise stimulation of tribostimulable phosphor crystals a differing pressure from one to another pixel is detectable, an image is generated. The image thus obtained is an image which is illustrative for e.g. the uniformity of a flat surface or coating of a material, for differences in the stiffness of e.g. a cardboard, a collar, a joint, etc., or every material having a profile with respect to pressure or whatever a physical (wave pattern, able to be transformed into pressure or able to cause pressure waves as e.g. acoustic waves as example of longitudinal waves, as also caused by oscillating springs or strings) or electrical property convertable to pressure signals.

Two-dimensional relief profiles or patterns thus obtained by those particular devices and variations thereupon, making use of the method of providing pressure measurements, according to the present invention opens perspectives with respect to applications in the domain of surface quality control of (composite) materials, research related with surface sciences, colloid surface sciences, thermographic properties (heat conductivity, expansion of materials caused thereby), hardening (chemical—as cross-linking processes—and physical—as phase transitions), orientation of crystals—also liquid crystals—as a function of external magnetic (e.g. microwaves, causing thermal effects and expansion of materials) and/or electrical sources, etc.

According to the present invention a device is thus provided offering pixelwise detection (in one or in two dimensions) of variations in pressure or electrical signals by means of at least one layer of piezo-electrical crystals as a source of pressure energy. According to the present invention a device is provided wherein pressure is applied linewise (in one dimension) by means of a knife-edge or (in two dimensions) by means of a roller as a source of pressure energy (applying pressure and pressure variations). Said knife-edge and said roller are, according to an embodiment of the device of the present invention, present as mechanical means transporting pressure energy and in a particular embodiment in said device according to the present invention, transmission means provided by said mechanical system proceed by means of a knife-edge or a roller.

The device according to the present invention having as an essential element a tribostimulable storage phosphor plate or panel thus comprises an alkali-halide phosphor as a tribostimulable phosphor in the most general form. More preferably the tribostimulable phosphor present in the device according to the present invention has a composition comprising at least one of CsBr, Cs Cl, RbBr, KCl or KBr. In a still more preferred embodiment said composition further comprises a dopant selected from the group consisting of Eu, Gd, Ga, Ca, Sr, Ge, Sn, Au, In, Tl, Sb, Tb and Ce or a combination thereof. Said dopant(s) is(are) present in an amount of from 500 up to 50000 p.p.m. or in an amount of from 0.1 up to 5% by weight.

In the device according to the present invention energy stored in a tribostimulable phosphor is thus converted (in part) by means of a source of pressure energy differing from direct air pressure energy. Converting energy stored in a tribostimulable phosphor panel or plate thus comprises the steps of (a) storing energy in a stimulable phosphor of a screen or panel comprising one or more layers comprising stimulable phosphors;

(b) converting said energy to emission energy by means of said source of pressure energy; and (c) detecting said energy.

Step (a) is required as the storage phosphor should be loaded with an amount of energy (exceeding a minimum level, preferably a well-known and well-defined amount of energy) in order to get pressure stimulability.

The device according to the present invention is provided with capturing means as has already been set forth, wherein said capturing means capture energy released from the tribostimulated phosphor sheet or panel in an amount proportional with the said pressure force. The device according to the present invention in one embodiment provides the tribostimulated light to be detected as a signal by capturing means and brought to a photomultiplier where the said signal is further processed. In a preferred embodiment said capturing means represent at least one line of optical fibers.

Further according to the present invention the device provides said detectable signal become a processed signal stored in an electronic memory. In a preferred embodiment said device is provided with a DSP(digital signal processing)-chip as a very suitable electronic memory, wherein said processed signal is stored. The device according to the present invention further comprises detecting means selected from the group consisting of a CCD, a photo-multiplier and a photodiode-array. In a preferred embodiment said CCD, photomultiplier or photodiode-array is in indirect contact with the storage panel by means of a fiber optic plate and in a particularly preferred embodiment said indirect contact is realized by means of a fiber optic plate or by means of an array of focusing cells or lenses.

The device according to the present invention in a preferred embodiment comprises a panel, a capturing means and a detecting means, built-in in a housing as a pressure meter device.

The device according to the present invention in a particular embodiment further contains as outermost layers covering the tribostimulable storage panel at its largest sides a layer, present at one or both of said largest sides, wherein said layer is a filter layer absorbing energy which should not be detected during exposure (in order to avoid deterioration of the calibrated amount of energy added to the storage phosphor panel);

at surrounding edges around the layers, a surrounding layer, wherein said layer is an optical filter layer transmitting exclusively energy released by said tribostimulable storage phosphor panel after tribostimulation.

In order to determine in a quantitative way stored amounts of radiation energy originating from radiation having a wavelength of 350 nm or less, the following method is very suitable as a method according to the present invention, said method comprising the steps of:

i) providing a device as described hereinbefore;

ii) irradiating said device by incident irradiation in such a way that the said tribostimulable storage panel is exposed with a calibrated amount of energy;

iii) reading out said storage phosphor panel by provoking stimulation of said tribostimulable storage phosphors by a source of pressure force;

iv) digitally detecting energy released from said tribostimulable storage phosphor panel by a detector;

v) erasing stored rest energy.

In a preferred embodiment of the present invention a method is provided to absorb or capture energy and reproduce quantitatively said energy originating from a pressure source by the device according to the present invention described hereinbefore, wherein said method comprises the steps of i) exposing the tribostimulable storage phosphor to a calibrated amount of penetrating radiation having a wavelength of 350 nm or less (X-rays and/or UV-rays), ii) storing the said calibrated amount of energy from said penetrating radiation in said storage phosphor, iii) releasing at least part of said stored energy as tribostimulated light by stimulating said phosphor with energy generated by a source of pressure force and iv) reading said tribostimulated light, characterized in that said phosphor is stimulated by pressure emanating from a pixel-wise driven piezo-electrical device.

In another preferred embodiment according to the present invention a method is provided for measuring a pressure force generated by making use of the following steps:

(i) absorbing and storing incident radiation energy originating from radiation having a wavelength of 350 nm or less (in a particular embodiment from radiation having a wavelength of 254 nm, corresponding with a mercury vapour lamp) wherein said panel is covered with an optical filter absorbing radiation having a wavelength of 350 nm or more;

ii) reading out said storage phosphor having pressure stimulating ability by adding stimulating energy to the said storage panel by means of pressure or energy convertable to pressure, iii) (digitally) detecting energy released from said storage phosphor panel by a detector as digitally detected energy, iv) storing said digitally detected energy (as e.g. individual digital data) in an electronic memory, v) plotting said data (from those digital measurements showing pressure variations) as a function of time, vi) erasing stored rest energy in the storage panel by means of energy from a light source (capable to discharge any energy stored as rest energy in the panel), a heat source or a pressure source.

According to the present invention methods have thus been provided, as described hereinbefore, wherein said phosphor is stimulated by pressure emanating sheetwise from a source of pressure energy.

In a particular embodiment according to the present invention a method for monitoring a dose of penetrating radiation absorbed by an object is provided, said method comprising the steps of (a) providing said object with a device for absorbing penetrating radiation, including a tribostimulable storage phosphor for storing energy from said penetrating radiation;

(b) at predetermined intervals coupling said tribostimulable storage phosphor to a source of pressure, activating said source of pressure in such a way as to cause said tribostimulable storage phosphor to emit an amount of fluorescent light proportional with an amount of stored energy;

(c) reading said amount of fluorescent light and converting it in an electric signal value or values;

(d) storing electric signal value(s) obtained at said predetermined intervals and processing them in order to evaluate a total amount of radiation absorbed by said object;

(e) comparing said total amount with a predefined threshold value in order to obtain a figure as a difference of values, and (f) displaying said figure on a (decentralized) display.

The alkali metal phosphors used in tribostimulable phosphor panels of devices according to the present invention can be produced according to any way known in the art, starting from phosphor precursors, e.g. oxides, carbonates, sulfonates, halides, phosphates, nitrates, oxalates, lactates, acetylacetonates, malonates, phthalates, alkoxides, phenoxides or ethylenediamine derivatives of the metalions that are to be incorporated in the phosphor. These phosphor precursors are mixed in the appropriate stoechiometric proportions and are then heated for a given time. After cooling, the sintered block of phosphor is milled into fine phosphor particles. The milling operation continues until phosphor particles with the appropriate average particle size and size distribution are obtained. During the preparation of the phosphor any known flux materials can be added to the reaction mixture. Flux materials useful for use in the preparation of the phosphors according to the invention are e.g. halides, metasilicates of alkali metals or alkaline earth metals.

A very useful and preferred method for the preparation of alkali metal phosphors suitable for use in tribostimulable phosphor panels of devices according to the present invention can be found in Research Disclosure Volume 358, Feb. 1994 p 93 item 35841. Another useful method can be found in U.S. Pat. No. 5,154,360.

The average grain size of said alkali metal-phosphors is preferably in the range of 2 to 25 $\mu$m, more preferably in the range of 3 to 15 $\mu$m.

The alkali metal phosphors for use in the method of the present invention are beneficially used in order to form a radiation image storage screen or panel. A storage panel or screen comprising such a phosphor for use in the method of the present invention comprises the steps of i) exposing a tribostimulable storage phosphor screen, ii) stimulating said tribostimulable screen in order to release the stored (high energetic X-ray, UV-ray..) energy as stimulated radiation (in form of visible) light and iii) collecting said stimulated light.

It is possible to use the alkali metal phosphors suitable for use in stimulable phosphor panels of devices according to the present invention either alone or mixed with one or more other phosphors. Mixtures of alkali metal phosphors and other tribostimulable storage phosphors can be useful but also for dual energy applications this may be applied, e.g. mixing tribostimulable phosphors with radiation stimulable phosphors (stimulable by a laser emitting light source between 500 and 1000 nm as e.g. an Ar gas ion laser (514 nm), a frequency double NdYAG laser (532 nm), a He-Ne laser (632 nm), a diode lasers emitting at 680 nm, a GaAs laser emitting at 835 nm, etc.), provided that the relative amounts of both types of stimulable phosphors and their relative absorption capacity of high energetic X-rays and/or UV-rays can be calculated in order to know the relative amounts of stored energy by said both types when calibration and/or precise knowledge of emitted energy is required.

The storage screen or panels used in devices according to the present invention can be prepared by vacuum deposition of tribostimulable phosphors on a support, yielding a panel or screen. Substantially no binder is then required. It is also possible to prepare panels by electro-depositing the tribostimulable phosphors onto the support also yielding a screen or panel comprising substantially no binder. A very suitable method for electro-depositing tribostimulable phosphors for use in a device according to the present invention has e.g. been disclosed in U.S. Pat. No. 5,296,117.

The storage screen or panel is either self-supporting or is coated on a support, whether or not comprising a binder in both cases.

Any binder known in the art can be used to form a screen or panel comprising a tribostimulable phosphor for use in the device according to the present invention. Suitable binders are, e.g., gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. Nos. 2,502,529; 2,887,379; 3,617,285;3,300,310; 3,300,311 and 3,743,833. A mixture of two or more of these binders may be used, e.g., a mixture of polyethyl acrylate and cellulose acetobutyrate. Weight ratios of phosphor to binder are generally within the range of from 50:50 to 99:1, preferably from 80:20 to 99:1. Preferably a self-supporting or supported layer of tribostimulable phosphor particles according to the present invention comprises said particles dispersed in a binding medium and a protective coating thereover characterized in that the binding medium substantially consists of one or more hydrogenated styrene-diene block copolymers, having a saturated rubber block, as rubbery and/or elastomeric polymers. The polymer can be represented by the formula A-B-A (tri-block) or by the formula A-B (di-block), wherein A represents styrene and B represents the hydrogenated diene block e.g. ethylene-butylene or ethylene-propylene. Further the ratio by volume of phoshor to binding medium is referably more than 70/30 and still more preferably more than 85/15.

By said hydrogenated diene copolymers, for use as rubbery and/or elastomeric polymers, the phosphor layer has improved elasticity of the screen, high protection against mechanical damage and thus high ease of manipulation and allow high pigment to binder ratio without getting deteriorated by ageing after frequent reuse. Particularly suitable thermoplastic rubbers, used as block-copolymeric binders in phosphor screens in accordance with this invention are the KRATON-G rubbers, KRATON being a trade mark name from SHELL. KRATON-G thermoplastic rubber polymers are a unique class of rubbers designed for use without vulcanisation. In the published report KR.G.2.1 (INTERACT/7641/2 m/1186 GP KRA/ENG) wherein a description of KRATON-G rubbers is given, the KRATON-G 1600 series rubbers are presented as block copolymers in which the elastomeric midblock of the molecule is a saturated olefin rubber. KRATON-G 1600 series rubbers are described to possess excellent resistance to degradation by oxygen, ozone and UV light and they also have high cohesive strength and retain their structural integrity at elevated temperatures.

The coating weight of tribostimulable phosphor particles can be adapted to the desired energy of the storage screen or panel to be captured, but preferably a coating weight between 5 and 250 mg/cm$^2$, most preferably between 20 and 175 mg/cm$^2$, is used.

A stimulable storage screen or panel for use in a device according to the present invention can be prepared by the following manufacturing process. The tribostimulable phosphor layer can be applied to the support by any coating procedure, making use of solvents for the binder of the phosphor containing layer as well as of useful dispersing agents, useful plasticizers, useful fillers and subbing or interlayer layer compositions that have been described in extenso in EP-A 0 510 753. Tribostimulable phosphor particles are mixed with the dissolved rubbery polymer, in a suitable mixing ratio to prepare a dispersion. Said dispersion is uniformly applied to a substrate by a known coating technique, e.g. doctor blade coating, roll coating, gravure coating or wire bar coating, and dried to form a phosphor layer. In the preparation of a tribostimulable storage screen, one or more additional layers are occasionally provided between the support and the phosphor containing layer, having subbing- or interlayer compositions, in order to improve the bonding between the support and the phosphor layer, or to improve the sensitivity of the screen or the sharpness and resolution of an image provided thereby. For instance, a subbing layer or an adhesive layer may be provided by coating polymer material, e.g., gelatin, a polyester cross-linked by a reaction with a tri-isocyanate or a polyester with only terminal hydroxyl groups, the chain length of which has been increased by the reaction of said terminal hydroxyl groups and a di-isocyanate, over the surface of the support on the phosphor layer side. Said subbing layer may contain also modified thermoplastic acrylic resins such as those described above to improve the adhesion properties of the subbing layers. After applying the coating dispersion onto the support, the coating dispersion is heated slowly to dryness so as to complete the formation of a phosphor layer. In order to remove as much as possible entrapped air in the phosphor coating composition it can be subjected to an ultrasonic treatment before coating. Another method to reduce the amount of entrapped air consists in a compression method as has been described in EP-A 0 393 662, wherein the said compression is preferably carried out at a temperature not lower than the softening point or melting point of the rubbery binder to improve the phosphor packing density in the dried layer. In order to avoid electrostatic discharges during manufacture of the screen, especially during the coating procedure, conductive compounds can be added to the phosphor/binder mixture or the support can be provided with a conductive layer (lateral resistance <1012 W/square) on that side of the support opposite to the side to be coated with the phosphor/binder mixture.

If necessary, after coating the phosphor/binder mixture the conductive layer on the side of the support opposite to the phosphor/binder mixture layer, may be covered by a plastic sheet or web material. After formation of the phosphor layer, a protective layer is generally provided on top of the phosphor layer. The protective coating composition can be applied as described e.g. in U.S. Pat. No. 4,059,768. In a preferred embodiment the protective coating composition is applied by a rotary screen printing device as has been described in detail in EP-A 510 753. The top coat is preferably formed by applying a radiation curable coating on top of the phosphor layer. When radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition.

To the radiation-curable coating composition there may be added a storage stabilizer, a colorant, and other additives, and then dissolved or dispersed therein to prepare the coating liquid for the protective layer. Examples of colorants that can be used in the protective layer include MAKROLEX ROT EG, MAKROLEX ROT GS and MAKROLEX ROT E2G. MAKROLEX is a registered tradename of Bayer AG, Leverkusen, Germany. A variety of other optional compounds can be included in the radiation-curable coating composition of the present storage article such as compounds suitable for reducing static electrical charge accumulation, plasticizers, matting agents, lubricants, de-foamers and the like as has been described in the EP-A 0 510 753. In said document a description has also been given of the apparatus and methods for curing. The edges of the screen may be reinforced by covering the edges (side surfaces) with a polymer material being formed essentially from a moisture-hardened polymer composition prepared according to EP-A 0 541 146. An other very useful way to reinforce of the edges of a screen or panel use in the device according to the present invention, is to coat the edges with a polymeric composition comprising polyvinylacetate, crotonic acid and isocyanates. Preferably a copolymer of vinylacetate and crotonic acid (e.g. MOWILITH CT5, a trade name of Hoechts AG, Frankfurt, Germany) is used in combination with isocyanates.

Support materials for tribostimulable storage screens suitable for use in devices in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film preferably employed as support material includes e.g. polyethylene terephthalate, clear or blue coloured or black coloured (e.g., LUMIRROR C, type X30, (trade name) supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties. These supports may have thicknesses which may differ depending on the material of the support, and may generally be between 60 and 1000 $\mu$m, more preferably between 80 and 500 $\mu$m from the standpoint of handling or mountability in the device according to the present invention.

A screen or panel comprising a tribostimulable phosphor useful in devices according to the present invention may carry an antistatic layer either on top of a protective layer or on the side of the support opposite to the side carrying said phosphor. Said antistatic layer may comprises inorganic antistatic agents, e.g. metal oxides as disclosed in e.g. EP-A 0 579 016 as well as organic antistatic agents (polyethylene oxides, poly(ethylenedioxy-thiophene) as disclosed in e.g. EP-A 0 440 957.

EXAMPLES

While the present invention will hereinafter be described in connection with preferred embodiments thereof, it will be understood that it is not intended to limit the invention to those embodiments.

DETERMINATION OF "TRIBOSTIMULABILITY" PROPERTIES OF THE PHOSPHORS

In order to determine whether or not the phosphor was showing tribostimulable properties, the phosphor was exposed to X-rays (200 kV, 10 mA) without filtering in dark with a dose of about 10 mGray. The phosphor crystal having two flat parallel surfaces was placed on a table.

With an optical filter BG39(3 mm) of Schott the crystal was pressed manually between the table and the optical filter.

Because the experiment was performed in a dark room, the emitted light was seen through the optical filter at the moment that a pressure force was applied.

The intensity of the emitted light caused by the pressure force was very much higher than the emitted light caused by afterglow. It was also found that the crystals are emitting strongly when the surface of the crystal was damaged with e.g. a knife or even with a finger nail.

When the crystal was cracked, an intense light pulse was detected.

When the crystal was not exposed to X-ray or was completely erased with a light source, no emitted light was found after carrying out the same experiments wherein a pressure force was applied to the crystal, wherein the crystal was damaged or cracked.

From these experiments it became clear that only stored energy, captured after a previous exposure with ionization radiation (as e.g. X-rays) of a composite storage phosphor crystal suitable for use in the method of the present invention was released by pressing, damaging or cracking the said crystal.

"TRIBOSTIMULABILITY" PROPERTIES OF PHOSPHORS FOR USE IN "PRESSURE METERS"

In order to make a "pressure meter" a pressure stimulable crystal, also called "tribostimulable crystal", was placed permanently on the site where the pressure should be measured.

The said crystal was irradiated beforehand with a well-known amount of energy, generated from UV- or X-rays in order to get a known amount of stored energy.

After the said exposure the emitted light was detected with a photomultiplier while releasing the known stored energy under the influence of an external pressure source.

Because the storage phosphor and the detector were reacting quickly, shortly and rapidly changing pressures were detected and pressure was plotted as a function of time.

As the reaction time of the "tribostimulable phosphor-photomultiplier" ("TSP-PMP") system was less than 1 $\mu$s it was shown that the said system was useful as a "pressure meter" as no other system has hitherto been known to provide such a speed in determining such small pressure force changements.

Having described in detail preferred embodiments of the current invention, it will now be apparent to those skilled in the art that numerous modifications can be made therein without departing from the scope of the invention as defined in the appending claims.

What is claimed is:

1. A device for measuring a pressure force or changes thereof applied by a pressure source differing from a direct air pressure source, and for reading out said pressure force, wherein said device comprises a tribostimulable storage phosphor sheet or panel adapted to absorb calibrated amounts of energy generated by incident radiation having a wavelength of 350 nm-or less, and means in order to apply the said pressure force onto the said tribostimulable storage phosphor sheet or panel and wherein said pressure source and said tribostimulable storage phosphor panel are positioned relative to each other so that pressure or variations thereof caused or generated by said pressure source reach said tribostimulable phosphor panel including tribostimulable storage phosphors thereby stimulating said tribostimulable phosphors by pressure in order to release tribostimulated light, said device further having capturing means to capture said tribostimulated light and detecting means to detect it.

2. Device according to claim 1, wherein a pressure force or variations thereof are directly performed onto said tribostimulable storage phosphor panel or indirectly performed on said panel by means of transporting or transmission means.

3. Device according to claim 2, wherein said transmission means are provided by a mechanical, an electrical, an electronic, a hydraulic or a pneumatic system.

4. Device according to claim 1, wherein said storage phosphor panel comprises a alkali-halide phosphor as a tribostimulable phosphor.

5. Device according to claim 1, wherein said capturing means represent at least one line of optical fibers.

6. Device according to claim 1, wherein said panel, said capturing means and said detecting means are built-in in a housing.

7. A device for measuring a pressure force or changes thereof applied by a pressure source differing from a direct air pressure source and for reading out said pressure force, wherein said device comprises a stimulable storage phosphor sheet or panel and means in order to apply the said pressure force onto the said stimulable storage phosphor sheet or panel and wherein said pressure source and said storage phosphor panel are positioned relative to each other so that pressure or variations thereof caused or generated by said pressure source reach said stimulable phosphor, called tribostimulable phosphor, thereby stimulating said phosphor by pressure in order to release tribostimulated light, said device further having capturing means to capture said tribostimulated light and detecting means to detect it, wherein a pressure force or variations thereof are directly performed onto said tribostimulable storage phosphor panel or indirectly performed on said panel by means of transporting or transmission means, wherein said transmission means are provided by a mechanical, an electrical, an electronic, a hydraulic or a pneumatic system, and wherein transmission means provided by said electrical system permits pixelwise detection of variations in electrical signals performed by means of at least one layer of piezeo-electrical crystals.

8. Device according to claim 7, having a layer of piezo-electrical crystals pixelwise performing pressure on the said storage phosphor panel by direct contact between said piezo-electrical crystals and said storage phosphor panel in order to read-out said tribostimulable storage phosphor panel imagewise, wherein said device is provided with means in order to apply an electrical field on said piezo-electrical crystals by row and column electrodes, provided at both sides of said layer and mounted perpendicularly to each other, coupled to a voltage source adapted for applying an electrical potential to each of said electrodes separately.

9. A device for measuring a pressure force or changes thereof applied by a pressure source differing from a direct air pressure source and for reading out said pressure force, wherein said device comprises a stimulable storage phosphor sheet or panel and means in order to apply the said pressure force onto the said stimulable storage phosphor sheet or panel and wherein said pressure source and said storage phosphor panel are positioned relative to each other so that pressure or variations thereof caused or generated by said pressure source reach said stimulable phosphor, called tribostimulable phosphor, thereby stimulating said phosphor by pressure in order to release tribostimulated light, said device further having capturing means to capture said tribostimulated light and detecting means to detect it, wherein said capturing means capture energy released from the tribostimulated phosphor sheet or panel in an amount proportional with the said pressure force and wherein said detecting means is selected from the group consisting of a CCD, a photo-multiplier and a photo-diodearray and wherein said CCD, said photo-multiplier or said photodiodearray is in indirect contact with the storage panel by means of a fiber optic plate or by means of an array of focusing cells or lenses.

10. Device according to claim 9, wherein the tribostimulated light is detected as a signal by capturing means and brought to a photomultiplier and where the said signal is further processed.

11. Device according to claim 10, wherein said processed signal is further stored in an electronic memory.

12. Device according to claim 11, wherein said electronic memory is a DSP(digital signal processing)-chip.

13. A method to determine in a quantitative way amounts of pressure energy comprising:
  i) providing a device for measuring a pressure force or changes thereof applied by a pressure source differing from a direct air pressure source and for reading out said pressure force, wherein said device comprises a stimulable storage phosphor sheet or panel and means in order to apply the said pressure force onto the said stimulable storage phosphor sheet or panel and wherein said pressure source and said storage phosphor panel are positioned relative to each other so that pressure or variations thereof caused or generated by said pressure source reach said stimulable phosphor, called tribostimulable phosphor, thereby stimulating said phosphor by pressure in order to release tribostimulated light, said device further having capturing means to capture said tribostimulated light and detecting means to detect it;
  ii) irradiating said device by incident irradiation in such a way that the said tribostimulable storage panel is exposed with a calibrated amount of energy;
  iii) reading out said storage phosphor panel by provoking stimulation of said tribostimulable storage phosphors by a source of pressure force;
  iv) digitally detecting energy released from said tribostimulable storage phosphor panel by a detector; and
  v) erasing stored rest energy.

14. Method according to claim 13, wherein said phosphor is stimulated by pressure emanating sheetwise from a source of pressure energy.

15. A method to absorb or capture energy and reproduce quantitatively said energy originating from a pressure source by a device for measuring a pressure force or changes thereof applied by a pressure source differing from a direct air pressure source and for reading out said pressure force, wherein said device comprises a stimulable storage phosphor sheet or panel and means in order to apply the said pressure force onto the said stimulable storage phosphor sheet or panel and wherein said pressure source and said storage phosphor panel are positioned relative to each other so that pressure or variations thereof caused or generated by said pressure source reach said stimulable phosphor, called tribostimulable phosphor, thereby stimulating said phosphor by pressure in order to release tribostimulated light, said device further having capturing means to capture said tribostimulated light and detecting means to detect it; said method comprising:
  i) exposing the tribostimulable storage phosphor to a calibrated amount of penetrating radiation having a wavelength of 350 nm or less,
  ii) storing the said calibrated amount of energy from said penetrating radiation in said storage phosphor, iii) releasing at least part of said stored energy as tribostimulated light by stimulating said phosphor with energy generated by a source of pressure force, and iv) reading said tribostimulated light, wherein said phosphor is stimulated by pressure emanating from a pixelwise driven piezeo-electrical device.

16. A method of measuring a pressure force generated comprising:

i) absorbing and storing incident radiation energy originating from radiation having a wavelength of 350 nm or less, wherein a storage phosphor panel is covered with an optical filter absorbing radiation having a wavelength of 350 nm or more;

ii) reading out said storage phosphor panel by adding stimulating energy to the said storage phosphor panel by means of pressure or energy convertable to pressure, iii) detecting energy released from said storage phosphor panel by a detector as digitally detected energy, iv) storing said digitally detected energy in an electronic memory, v) plotting said data as a function of time, and vi) erasing stored rest energy in the storage panel by means of energy from a light source, a heat source or a pressure source.

17. Method for monitoring a dose of penetrating radiation absorbed by an object, said method comprising the steps of (a) providing said object with a device for absorbing penetrating radiation, including a tribostimulable storage phosphor for storing energy from said penetrating radiation;

(b) coupling said tribostimulable storage phosphor at predetermined intervals to a source of pressure, activating said source of pressure in such a way as to cause said tribostimulable storage phosphor to emit an amount of fluorescent light proportional with an amount of stored energy;

(c) reading said amount of fluorescent light and converting it in an electric signal value or values;

(d) storing electric signal value(s) obtained at said predetermined intervals and processing them in order to evaluate a total amount of radiation absorbed by said object;

(e) comparing said total amount with a predefined threshold value in order to obtain a figure as a difference of values, and (f) displaying said figure on a display.

* * * * *

UNITED STATES PATENT AND TRADEMARK OFFICE
CERTIFICATE OF CORRECTION

PATENT NO.    : 6,476,406 B1
DATED         : November 5, 2002
INVENTOR(S)   : Luc Struye et al.

It is certified that error appears in the above-identified patent and that said Letters Patent is hereby corrected as shown below:

Column 1,
Line 3, "$(M_{1-X}.M^1{}_X)X.aM^{2+}X._2.bM^{3+}X”_3:dB$," should read
-- $(M_{1-X}.M'_X)X.aM^{2+}X'_2.bM^{3+}X”_3:dB$, --.

Column 4,
Lines 33 and 38, "Cs Cl" should read -- CsCl --.
Line 40, "CsBr:Ge" should read -- CsBr:Ge; --.
Line 41, "Cs Cl:Eu;" should read -- CsCl:Eu; --.
Line 41, "Cs Cl$_{0.5}$Br$_{0.5}$:Eu;" should read -- CsCl$_{0.5}$Br$_{0.5}$:Eu; --.
Line 45, "KCl(1-x) Br(x):Eu," should read -- KCl(1-x)Br(x):Eu, --.

Column 6,
Line 33, "in-noise" should read -- in noise --.
Line 55, "waves,etc." should read -- waves, etc. --.

Column 8,
Line 11, "In-another" should read -- In another --.

Column 9,
Line 49, "Cs Cl," should read -- CsCl, --.

Column 14,
Line 36, "<1012 W/square)" should read -- < $10^{12}$ W/square) --.

Column 16,
Line 56, "nm-or" should read -- nm or --.

UNITED STATES PATENT AND TRADEMARK OFFICE
CERTIFICATE OF CORRECTION

PATENT NO.    : 6,476,406 B1
DATED         : November 5, 2002
INVENTOR(S)   : Luc Struye et al.

It is certified that error appears in the above-identified patent and that said Letters Patent is hereby corrected as shown below:

Column 18,
Line 2, "photo-diodearray" should read -- photodiode-array --.

Signed and Sealed this

Eleventh Day of March, 2003

JAMES E. ROGAN
*Director of the United States Patent and Trademark Office*